Patented June 24, 1930

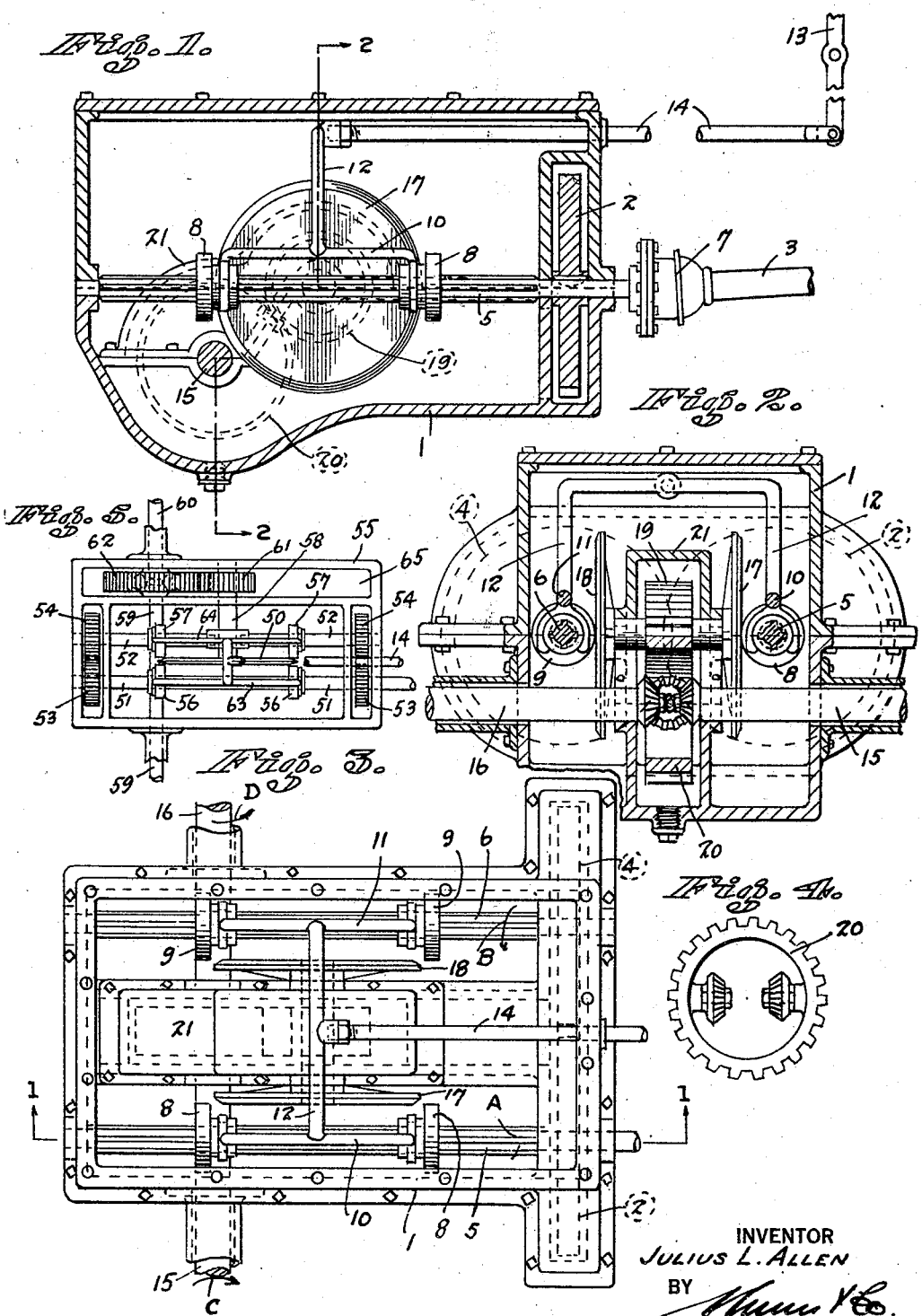

1,766,240

UNITED STATES PATENT OFFICE

JULIUS L. ALLEN, OF SACRAMENTO, CALIFORNIA

VARIABLE-SPEED TRANSMISSION

Application filed June 7, 1927. Serial No. 197,115.

My invention relates to improvements in variable speed transmissions, and it consists in the combinations, constructions and arrangements hereinafter described and claimed.

An object of my invention is to provide a variable speed transmission which is an improvement over my patented device #1,615,432, issued January 25th, 1927. In said patent I show a variable speed transmission which makes use of two friction discs and two friction wheels, one for each disc, these wheels being manually movable across the faces of the discs for changing the speed of the device with respect to the speed of the driving shaft.

My present device differs from the patented device in the provision of a housing disposed between the two discs, this housing enclosing the necessary gears. This construction permits the gears to be bathed in a lubricant while still keeping the discs away from the lubricant so that they will operate efficiently at all times.

A further object of my invention is to provide a device of the type described, which employs two friction wheels for each disc, these wheels being mounted so that either wheel may be moved across the surface of its disc for causing the driven shaft to be rotated in one direction or the other, and to have its speed ratio changed with respect to the driving shaft.

Other objects and advantages will appear in the following specification, and the novel features of my invention will be particularly pointed out in the appended claims.

My invention is illustrated in the accompanying drawing forming a part of this application, in which Figure 1 is a section along the line 1—1 of Figure 3;

Figure 2 is a section along the line 2—2 of Figure 1;

Figure 3 is a top plan view with the cover plate removed;

Figure 4 is a detail view of the differential employed; and

Figure 5 is a top plan view of a modified form of the device.

In carrying out my invention I provide a casing 1 of the shape shown in Figures 1 and 3. A drive shaft 2 enters the casing 1 and has a gear 2 mounted thereon, the gear 3 is in mesh with a gear 4 and these gears rotate splined shafts 5 and 6, see Figure 3. The splined shaft 5 really projects a slight distance beyond the casing 1 and connects with the drive shaft 3 by means of a universal joint 7 if desired. This construction adapts the device for automobile transmissions. The shafts 5 and 6 are rotated in the direction of the arrows A and B, and rotate friction wheels 8—8 and 9—9 therewith. The wheels 8—8 and 9—9 are slidable on the shafts 5 and 6 respectively and are held in spaced relation by yokes 10 and 11, these yokes being connected to a common arm 12, which in turn is operatively connected to a lever 13 by a rod 14. The yokes 10 and 11 permit rotation of the wheels 8—8 and 9—9 by moving the wheels along the shafts 5 and 6 when the lever 13 is actuated.

Figure 3 shows the wheels in neutral position. The power is transmitted from the wheels to the driven shafts 15 and 16 by discs 17 and 18, gear 19 and a differential 20. It is obvious that the differential 20 may be dispensed with if it is desired to directly connect the shafts 15 and 16 together and have them rotate as a unit. The differential, however, is used when the device is placed in automobiles. When the device is used for stationary machinery the differential and also the universal joint 7 may be dispensed with.

If it is desired to rotate the shafts 15 and 16 in the direction of the arrows C and D, in Figure 3, the lever 13 is manually moved for bringing the desired set of friction wheels 8 and 9 into frictional engagement with the discs 17 and 18. As the wheels are moved toward the center of the discs, the discs will be rotated faster and will raise the speed of the shafts 15 and 16. It is obvious that the other wheels 8 and 9 are moved further away from the discs during this operation.

If it is now desired to reverse the rotation of the shafts 15 and 16, the lever 13 is moved in the opposite direction and will disengage the wheels 8 and 9, which formerly connected the moving parts together and will engage the other wheels. This, of course, will rotate the discs in the opposite direction and cause the shafts 15 and 16 to reverse their movement. With this novel construction it is impossible to change the rotation of the shaft from one direction to the opposite direction when the shaft is rotating at a high speed. In other words, it is necessary to first move the wheels 8 and 9 which connect the discs to the shafts 5 and 6, from the center of the discs to the periphery of the discs and then move them clear before the other wheels will contact with the discs. This movement of the wheels will gradually reduce the speed of the shafts 15 and 16 and thus make it easy for the shafts to be rotated in the opposite direction when the other set of wheels engage with the discs. The other set of wheels will, of course, first contact with the surfaces of the discs adjacent to the peripheries and will cause the shafts 15 and 16 to rotate slowly in the opposite direction. From this point the shafts may be increased in speed by moving the lever 13 for advancing the wheels 8 and 9 across the surfaces of the discs.

Figure 2 clearly shows how the discs 17 and 18 are separated from each other by a casing 21 and further shows how the casing houses the gear 19 and the differential 20. This casing acts as a reservoir for a lubricant and prevents the lubricant from contacting with the surfaces of the discs. In this way the device overcomes the disadvantage of having the friction wheels slip on the discs, due to grease or other lubricant dropping upon the surfaces of the discs. If desired, the wheels 8—8 and 9—9 may be urged toward the discs 17 and 18 by the spring mechanism shown in my patented application.

In Figure 5 I show a slightly modified form of the device in which one disc 50 is used in place of the two discs. Power is transmitted to this disc by shafts 51 and 52, these shafts being geared together by gears 53 and 54 disposed at both ends of the casing 55. The disc is operatively connected to shafts 51 and 52 by friction wheels 56—56 and 57—57. Figure 5 further shows how the disc is mounted upon a shaft 58 and is connected to shafts 59 and 60 by a gear 61 and a differential 62. This form of the device is identical to the form shown in Figures 1 and 3, with the exception that one disc is used in place of two. The disc 50 may be rotated in either direction and in various speeds by moving the rod 14, shown in Figure 5, this rod moving the wheels 56—56 and 57—57 by yokes 63 and 64. The compartment 65 housing the gear 61 and the differential 62 is moved to one side of the casing 55.

It will be noted from Figure 5 that the shaft 52 is in two sections which have their adjacent ends supported by a bearing mounted upon the shaft 58.

I claim:

1. A variable speed transmission comprising a casing, two drive shafts operatively connected together, two friction wheels splined to each drive shaft, a pair of discs, means for moving said wheels into engagement with said discs, driven shafts, operative means connecting said discs with said driven shafts, said means being interposed between said discs and a receptacle enclosing said means.

2. A variable speed transmission comprising a casing, a pair of drive shafts, a pair of friction wheels mounted on each drive shaft, a pair of discs disposed between the pairs of wheels, said discs being operatively connected to each other, and means for simultaneously moving all of said friction wheels for causing said wheels to contact with said discs for rotating said discs in either direction.

3. A variable speed transmission comprising a casing, a pair of drive shafts operatively connected together, friction wheels feathered on each of said shafts, discs frictionally engageable by certain of said wheels, driven shafts, means connecting said discs with said driven shafts and including a differential, and a lubricant-retaining casing housing said means.

JULIUS L. ALLEN.